US010810167B1

(12) United States Patent
Mahajan

(10) Patent No.: US 10,810,167 B1
(45) Date of Patent: Oct. 20, 2020

(54) ACTIVITY VERIFICATION USING A DISTRIBUTED DATABASE

(71) Applicant: A9.com, Inc., Palo Alto, CA (US)

(72) Inventor: Satayan Mahajan, Cambridge, MA (US)

(73) Assignee: A9.COM, INC., Palo Alto, CA (US)

(*) Notice: Subject to any disclaimer, the term of this patent is extended or adjusted under 35 U.S.C. 154(b) by 251 days.

(21) Appl. No.: 16/051,076

(22) Filed: Jul. 31, 2018

(51) Int. Cl.
*G06F 16/18* (2019.01)
*G06F 21/64* (2013.01)
*H04L 9/06* (2006.01)
*G06Q 50/00* (2012.01)
*H04L 9/32* (2006.01)

(52) U.S. Cl.
CPC .......... *G06F 16/1805* (2019.01); *G06F 21/64* (2013.01); *G06Q 50/01* (2013.01); *H04L 9/0637* (2013.01); *H04L 9/3236* (2013.01); *H04L 2209/38* (2013.01)

(58) Field of Classification Search
CPC ..... G06F 16/1805; G06F 21/64; G06Q 50/01; H04L 9/0637; H04L 9/3236; H04L 2209/38
USPC ........................................................ 713/168
See application file for complete search history.

(56) References Cited

U.S. PATENT DOCUMENTS

| 10,121,025 | B1* | 11/2018 | Rice | H04L 9/30 |
| 10,135,834 | B1* | 11/2018 | Galebach | H04L 63/102 |
| 10,636,102 | B1* | 4/2020 | Larimer | G06Q 50/01 |
| 2014/0081750 | A1* | 3/2014 | Hosp | G06Q 30/0207 705/14.53 |
| 2017/0192994 | A1* | 7/2017 | Hong | G06F 16/164 |
| 2018/0225693 | A1* | 8/2018 | Postrel | H04L 67/20 |
| 2018/0293670 | A1* | 10/2018 | Yin | H04L 9/3236 |
| 2018/0315051 | A1* | 11/2018 | Hurley | G06Q 20/02 |
| 2019/0019208 | A1* | 1/2019 | Postrel | H04L 67/22 |
| 2019/0042620 | A1* | 2/2019 | Garagiola | G06F 16/2453 |
| 2019/0121813 | A1* | 4/2019 | Galebach | H04L 9/3247 |
| 2019/0180329 | A1* | 6/2019 | Chetlur | H04L 9/3239 |
| 2019/0311353 | A1* | 10/2019 | Solis | G06Q 20/381 |

* cited by examiner

*Primary Examiner* — Michael S McNally
(74) *Attorney, Agent, or Firm* — Hogan Lovells US LLP

(57) ABSTRACT

Various embodiments of systems and methods allow a distributed database to be maintained to store records of activities that may promote purchasing a product and determine whether such promotions should be rewarded. Using anonymous identifiers and a permission-based system, identities of users, products, content, content distribution systems, and marketplaces can be made available only to parties with rights to know such identities. Furthermore, systems can be put in place so that activities with a certain product, content item, etc. can be monitored without ever disclosing the identity of the product, content item, etc. In some embodiments, the database can be an immutable, append-only, distributed database such as a blockchain ledger.

20 Claims, 9 Drawing Sheets

US 10,810,167 B1

ACTIVITY VERIFICATION USING A DISTRIBUTED DATABASE

BACKGROUND

As the Internet has grown in popularity and utility, users are increasingly turning to online resources to learn about various types of content, as may relate to products and services. Traditional research methods might include asking users what influenced their activity and attempting to identify the effectiveness of content discovery campaigns based on those surveys. While mass approaches allow a company to reach a wide audience for relatively low cost, many user decisions are made based on individual recommendations and opinions from friends and associates.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to track, verify, and reward promotional activity and purchase activity. Certain databases can be used such as a distributed database or blockchain for such purposes. In order to promote trust between various entities that may be interested in downstream or upstream activity, a distributed database can be maintained to store records of activities that may promote purchasing and determine whether such promotions should be rewarded. Using anonymous identifiers and a permission-based system, identities of users, products, content, entities, and marketplaces can be made available only to parties with rights to know such identities. Furthermore, systems can be put in place so that activities with a certain product, content item, etc. can be monitored without disclosing the identity of the product, content item, etc. In some embodiments, the database can be an immutable, append-only, distributed database such as a blockchain ledger. A consensus system can ensure trust with the ledger. When a purchase is made, an entity can review the database to determine what activity lead to the purchase of the product. For example, the entity can determine that a first user (whose identity is anonymized) published a content item on a content distribution system promoting the product, that a second user viewed the content item, and that the second user shortly thereafter purchased the product. The entity can then offer a reward to the promotor of the product, the content distribution system hosting the content item, and the marketplace where the product was purchased. Such a reward can be determined using a smart contract and can provide a reward that is tracked and verified within the system such as a cryptocurrency.

Various other functions and advantages are described and suggested below as may be provided in accordance with the various embodiments.

Figure 1:
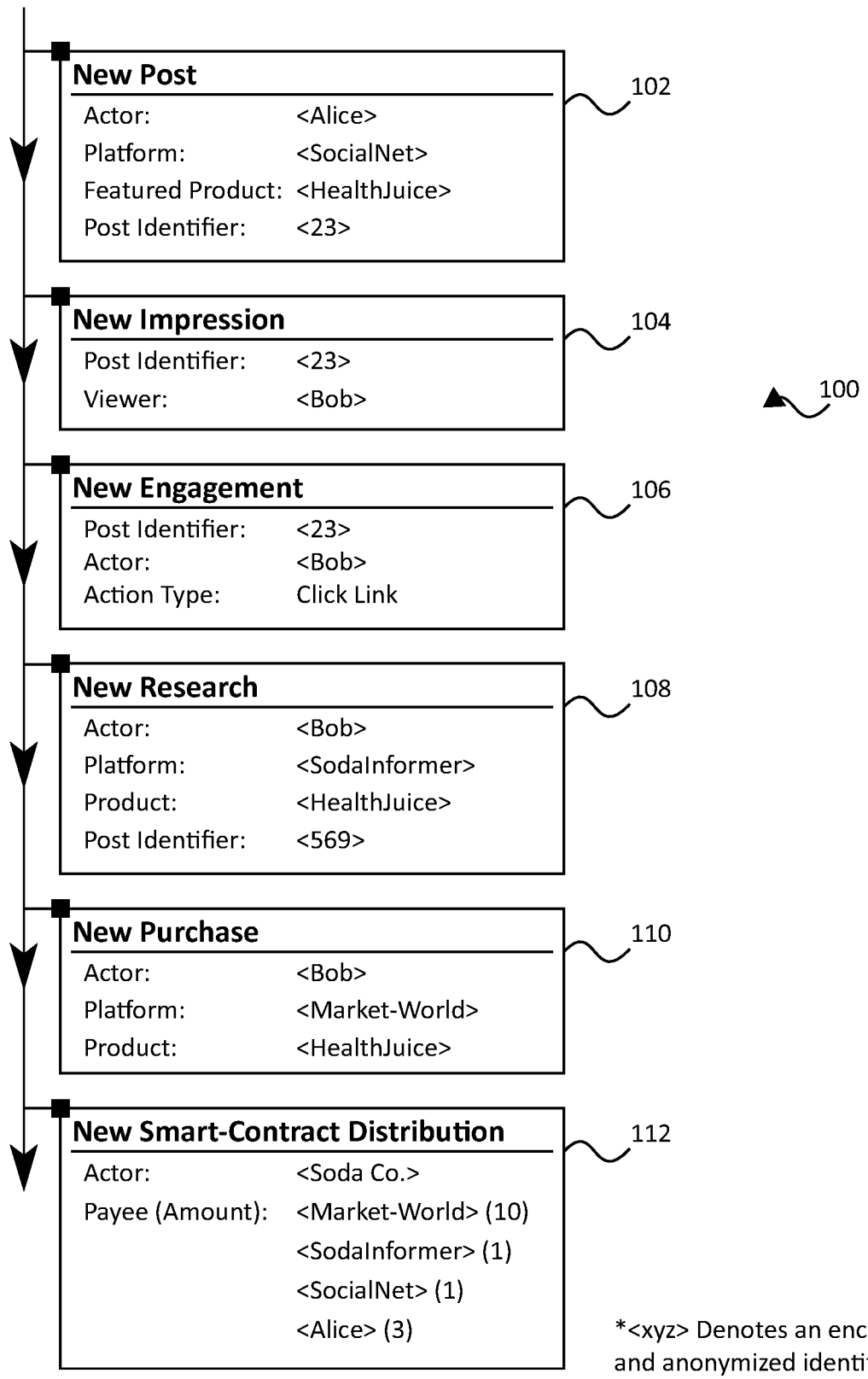
FIG. 1 illustrates an example blockchain that can track and verify activities according to various embodiments.

FIG. 1 illustrates an example blockchain 100 that can track and verify activities according to various embodiments. Various parties can participate in a private blockchain to verify activities that are associated with a purchase of an item. These parties may have agreements with each other that depend on actions that others do. As described herein, it can be useful to have a record of these agreements and actions. The records can be stored on a database/blockchain.

Throughout the specification, the terms blockchain and database are discussed. For the purposes herein, a blockchain is a subset of a database. For example, a blockchain can be a type of database characterized by an immutable "ledger" (i.e., "append-only") that is enforced by a distributed consensus. Other database structures and styles are contemplated, for example NoSQL, MySQL, etc. The database can be relational, non-relational, object-oriented, tabular, etc. Mention of a database should not be exclusive of a blockchain or vice versa as appropriate. In some embodiments, a database that is not blockchain based can be still established as an immutable ledger with append-only attributes, though such characteristics might be enforced and managed by a single entity or small group of entities. Even if a single entity maintains the database, other entities can validate the immutability of the database. For example, a marketplace can receive and apply new items to the database, while disseminating copies of the resulting database to other parties. The other parties can validate their copies are consistent with other entities' copies through algorithms that are Byzantine Fault Tolerant (i.e., even if certain entities in the system are malicious or faulty, the algorithm can still provide verification for the trustworthy entities). When an entity submits a new entry to be added to the database, it can determine that it has successfully been added to the database once a group of other entities have verified that they have observed the new entry.

The database can be hosted at a single resource, a managed network of resources, an unmanaged network of resources, etc. Resources can be permissioned such that only resources or entities that are authorized can access the database. In some embodiments, a resource or entity is only permitted to access a portion of the database. In some such embodiments, even if each entity or resource has a copy of the entire database, certain parts might be inaccessible based on the credentials of the resource or entity (e.g., the resource or entity lacks a key to decrypt those parts). A non-permissioned resource or entity might be only provided with a portion or portions of the database. Various portions of the database can be distributed throughout the system of resources. For example, resource A might have access to portions X and Y, resource B might have access to portions Y and Z, and resource C might have access to portions X and Z. Resources A, B, and C can then validate portions X, Y, and Z. Distributing portions in this manner might require a minimum number of entities having access to each portion to ensure proper validation.

In some embodiments, entities engaging with the database (e.g., participants of a blockchain system) can fulfill different roles. One role can be to provide consensus, one role can be to commit data to the database (e.g., add transactions), and one role can be to endorse (e.g., validate or authenticate) participants in the system. An entity can have multiple roles (e.g., consensus and commit, commit and endorse, or consensus and endorse). An entity can change roles over time. In some embodiments, entities that endorse can assign roles to other entities.

Each block can include one or more entries (e.g., transactions). In the example blockchain 100, each block is represented with one entry. Blocks can have a minimum or maximum entry count. A block can have a standardized entry count. For example, each block might have 10 entries. A block can include a hash of the previous block on the chain, a nonce that serves as a proof of work of the entity (e.g., miner) that created the block, a timestamp, etc. The block can include a hash derived from entries within the block.

Entries can have a standard form. For example, an entry can specify an actor, an action, and a subject that receives that action. In some embodiments, entries can have a variable form (e.g., a variable length string). An entry can contain a data object (e.g., a JavaScript Object Notation (JSON) encoded object). An entry can contain instructions.

Data and/or identities can be encrypted or otherwise stored such that unauthorized parties cannot decipher or interpret the data. For example, instead of storing plain-text identifiable information, an entry can store an encrypted version of the identifiable information. In some embodiments, an entity (e.g., a user account) can be associated with multiple random identifiers such that even if an unauthorized party accessed the database, they would be unable to associate all activity with the user account. For example, a first identifier can be used when a user accesses a social media post referencing a product and a second identifier can be used when the user purchases the product from a marketplace. If each of those actions is stored on a distributed database, the social media content distribution system would not be able to associate the first identifier viewing the social media post with the second identifier purchasing the product from the marketplace. Certain mechanisms can be instituted so that authorized entities can determine that multiple identifiers refer to the same entity. For example, a validation service can determine that an entity is authorized to access identifiers (e.g., all or a subset of identifiers) for another entity. Cryptographic relationships (e.g., a Merkle tree) can be used to validate that the multiple identifiers truly belong to the same entity.

An entry can indicate that an actor published a content item featuring a product on a content distribution system (e.g., entry 102). For example, an actor can be an entity participating in the system (e.g., the database and/or blockchain). The actor can be a person such as a user, a user account, a program, etc. The actor can have an account with just the content distribution system (e.g., and not have an account with a marketplace described later). The account with the content distribution system can be used to gain access to the database system.

The content item can be a picture, audio clip, video recording, "live stream," text post, file, blog, website, page, document, database item, etc. The content item can be published on a content distribution system such as a social media content distribution system or other publishing content distribution system. The content item can be publicly available or have restricted access. Because the content item might be restricted access, the entry (e.g., the entry in the database) can be sufficiently encrypted to protect content from being detected by unauthorized parties.

The product can be any item available to purchase, rent, borrow, stream, access, download, etc. The product can be physical such as a bicycle and/or the product can be digital such as a digital movie. In some embodiments, the actor (e.g., the content creator) can have a relationship with a manufacturer or distributor of the product. This might be the case if the actor is a paid advertiser or promotor of the product. This is not always necessary however, and the actor might not have an established relationship with a manufacturer, distributor, etc. of the product.

When the actor creates or otherwise prepares the content item for publication, the actor can manually identify the product. For example, related to entry 102, Alice (or a computing device associated with Alice) might retrieve an identifier for "HealthJuice" and specify that identifier during the content item creation process. This can take the form of a special "hashtag," link, or unique ID. In some embodiments, an automatic system can identify (e.g., through image recognition) the product within the content item. This can be especially useful in content items that change over time (e.g., video and/or audio) whereby the product identifier can be linked to a timecode of the content item. A database can be stored with a marketplace that can assist in identifying products and providing unique identifiers for the product.

In some embodiments, the content item is stored in a blockchain system, such as a distributed Internet. Alternatively, the content item can be stored at a database controlled by a single entity (e.g., a traditional web server). The content item can be transient (e.g., deleted after a period of time); the entry can provide evidence that the content item was published and once available, even if the entry does not contain the content of the content item.

An entry can indicate that an actor saw the content item on the content distribution system (e.g., entry 104). This can trigger when a computing device associated with the actor (e.g., viewer or listener) renders the content item or a portion of the content item with the product. For example, if the content item is a post on a social media content distribution system, the entry can represent that a device associated with "Bob" (per FIG. 1) has rendered the content item on screen. In some embodiments, the entry can also manifest that the actor perceived the content item for at least a minimum period of time. This can be useful to indicate that a viewer did not merely scroll past the content item, but lingered and paid attention to it. The entry can indicate that the actor listened or watched a portion of the content item that featured the product.

In some embodiments, certain techniques can be utilized to preserve the true identity of people, content items, products, etc. in the blockchain or database. For example, a user can have multiple automatically generated aliases as described before. An entity could not associate the various aliases without proper permission and/or a correct decryption key. Similarly, content items, products, content distribution systems, marketplaces, etc. can have multiple aliases that can hide the true identities of the objects or entities. For example, in block 102 the post identifier can be different than the post identifier in block 104, even though they can be associated (with the right credentials) with the same post.

A computing system associated with the actor (e.g., "Bob" in entry 104) can submit entry 104. For example, the system (e.g., using a web browser or app) can be operated by "Bob" to access the content distribution system and view/perceive the content item. This system can then generate block 104 reporting that the actor perceived the content item. Additionally or alternatively, a computing system (e.g., a webserver) associated with the content distribution system can generate entry 104 upon sending data for the content item to a client device associated with the actor.

An entry can indicate that an actor engaged the content item on the content distribution system (e.g., entry 106). Engagement can include any action that the actor can do with regards to the content item. Engagement can include selecting a button, clicking a link, commenting on the content item, sharing the content item, downloading the content item, responding to the content item, etc. If a content item is interactive, engagement can include interacting with the content item.

An entry can indicate that an actor performed research on the product (e.g., entry 108). Many customers will do research on the Internet before making a purchasing decision. This can include reading reviews, watching unboxing videos, asking a web forum for advice, pulling up specifications, visiting a manufacturer's website, etc. These researching activities can contribute to a purchasing decision similar to other forms of marketing. Research activities can be tracked by adding entries into the database (e.g., entry 108). It is imperative that such research activities are cryptographically anonymized so that malicious or malfunctioning systems cannot determine what the actor did without proper authorization (e.g., from the actor). In some embodiments, the actor, or a system under control of the actor, can provide entry 108 under authorization from the actor. Additionally or alternatively, the actor can provide a unique identifier to a researching content distribution system that can, with proper credentials, be linked to an identifier for the actor in other entries.

A researching content distribution system can be a website, a blog, a podcast, a digital assistant (e.g., interfaced using a "smart speaker"), a forum, a social media content distribution system, a search engine, etc. In some embodiments, an entry 108 can include an indication as to how influential the researching activity likely is to any ultimate purchase. For example, the entry 108 can indicate a number of times the actor visiting the content distribution system, how long the actor was on the content distribution system, to what extent the actor engaged the content distribution system (e.g., the actor compared product x to product y, the actor asked questions about the product, etc.), whether the actor selected any items in the content distribution system or clicked any links related to the product (e.g., linking the actor to a marketplace website), whether the actor bookmarked the research content distribution system, whether the actor copied text from a research article on the product, etc.

Entry 108 can indicate a specific "post" or content item identifier associated with the actor's research. For example, a post identifier can indicate that the actor visited a particular research article. In some embodiments, the entry 108 identifies one or more authors associated with the actor's research. For example, if other customers that have previously purchased the product then post their reviews of the product, the reviewers that influence the actor to purchase the product can be recognized and compensated. Such reviews can include text, images, video, ratings, etc. In some embodiments, a favorability metric of the review can be included in entry 108 and recognition can be given only to positive (i.e., favorable) reviews.

An entry can indicate that an actor purchased the product on a marketplace (e.g., entry 110). The entry can indicate that the actor bought, sold, bartered, rented, leased, downloaded, streamed, played, accepted a trial of, listened to, watched, etc. a product. The product can be physical, digital, a combination of physical and digital (e.g., software on a disk), an experience, a service, etc. The marketplace can be any content distribution system or service that facilitates transactions between two parties. The marketplace can be a single-seller marketplace where all the products offered for sale are provided by a single seller, a multi-seller marketplace, etc. In some embodiments, the marketplace is a distributed marketplace whereby parties record their transactions on a secure and immutable database (e.g., a blockchain).

An entry can include instructions to perform when certain conditions are met (e.g., entry 112). Such instructions can be a form of smart contract. For example, a manufacturer, marketplace, seller, or other interested party can put a smart contract on the database/blockchain which will execute when certain conditions are met. A smart contract can essentially be one or more if-then statements. An interested party can specify that if a customer purchases a specific product, then entities that contributed to that purchase can be recognized, compensated, and/or rewarded according to certain rules. In example entry 112, Soda Co. (i.e., the manufacturer) can specify that Market-World (i.e., the marketplace), SodaInformer (i.e., the research content distribution system), SocialNet (i.e., the social media content distribution system), and Alice (i.e., the promoter) all get rewarded for their contribution. The smart contract can specify rewards based on the recentness of various actions. For example, if a customer had viewed a post just before purchasing a product, the author of the post can be rewarded more than had the customer viewed the post weeks before purchase. The smart contract can indicate that certain types of entities that contributed to purchase ("contributors") are compensated more than others, for example, marketplace contributors can be rewarded more than research contributors.

In some embodiments, the smart contract can specify an "oracle" or a trusted entity that can verify that the action occurred. For example, the smart contract can be dependent on a marketplace database. In order to verify a triggering action such as a purchase of a product, the smart contract (e.g., the system that executes the smart contract) can review the database/blockchain. If two or more entries in the database/blockchain corroborate an event, then the smart contract can "trust" that the event occurred. For example a purchaser (e.g., a computing system associated with the purchaser) can append an entry indicating that the purchaser has purchased a product while a manufacturer can also append an entry indicating that the purchaser has purchased the product. A smart contract can specify a number of authenticators (e.g., a number of entities publishing entries on the database/blockchain) required to validate the trigger for the smart contract.

A smart contract can determine a benefit to be bestowed in the blockchain environment. For example a cryptocurrency can be utilized to track and verify benefits and redemption of benefits. Cryptocurrency transactions can be tracked and verified using the blockchain ledger. The marketplace can issue its own cryptocurrency and redemption can occur within the marketplace. Redemption can include a discount on a product. In some embodiments, entities utilizing the blockchain system can have a level of "trust," "stake," or other notoriety metrics such that certain entities can be trusted more than others. As an entity interacts with the database/blockchain, and as such interactions are validated by other trusted entities, the entity can see an increase in trust and privileges. The reward described in entry 112 can be bestowed only when it is calculated that the recipient has sufficient trustworthiness on the network.

It should be understood that the smart contracts as described herein need to be triggered solely by purchasing. A smart contract can be triggered (e.g., executed or activated) when a certain number of users have viewed or interacted with a content item, when a user with a sufficiently large following has posted a content item featuring a product, when a content item has been available for a certain amount of time (e.g., to prevent a user from posting and immediately deleting the content item), etc. It also should be understood that the principles herein are also applicable to environments without marketplaces, products, and financial transactions. For example, a community where people can ask and answer questions can utilize these principles to show when a post was particularly helpful and can provide accolades (though smart contracts) as rewards for such helpful posts.

As described herein, entities and objects can be referenced directly (e.g., by name, web address, UPC, address, etc.). In the interest of privacy however, entities and objects should be cryptographically anonymized as necessary. For example, each time an entity is represented on the database/blockchain, it can be given a distinct identifier for that entry. A special key can be associated with a set of identifiers; such a key can be used to associate those identifiers within the set. In some embodiments, an authorization authority can maintain true identities and can inform other validated entities which distinct identifiers are associated with others. This way, a manufacturer of a product can determine that a certain purchaser first heard about the product through a post on a social media site, then did research on a research site, then purchased the item on a marketplace. Even though the manufacturer can be authenticated to validate that those events occurred and are related to each other, the manufacturer can be prevented from knowing which social media site, which research site, the true identity of the purchaser, which marketplace, unrelated purchases made by the purchaser (e.g., because those purchases are reflected using a different unique identifier on the database/blockchain).

FIGS. 2A-2D show example screenshots according to some embodiments. FIGS. 2A-2D show an example flow of actions that can be recorded on the database/blockchain as described herein. It should be understood that the screenshots herein depicted are examples only, and other interfaces for actions are contemplated. For example, an interface can include an audio-based smart assistant, a videogame, a telephone call, a video conference, etc. Various devices can be used as well, such as smart speakers, televisions, videogame systems, virtual/augmented reality systems, etc. A combination of systems and interfaces are contemplated such that one action can be performed on a first interface while a second action can be performed on a second interface.

Figure 2A:
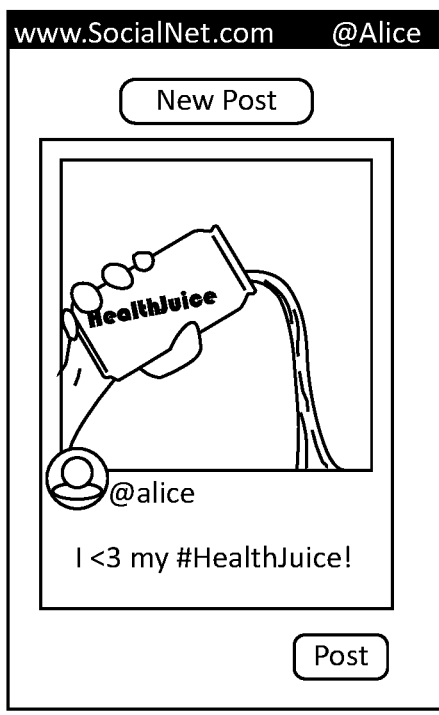
FIGS. 2A-2D show an example flow of actions that can be recorded on a database/blockchain as described herein.

FIG. 2A depicts a screenshot 202 wherein an author (Alice) is creating a content item featuring a product (HealthJuice) on a social media content distribution system (SocialNet.com). Alice can, when she creates the content item, indicate that she wishes to participate in an affiliate program. SocialNet.com can indicate with the content item that the content item is participating in the affiliate program (e.g., "Alice may receive a benefit if you purchase HealthJuice after seeing this post"). When Alice creates the content item, a system can generate a unique identifier for the content item to be provided with the content item.

In some embodiments, a system can automatically detect a product in a content item. The system can determine that the content item matches certain presentation guidelines for the product (e.g., that the name is fully legible, that the content item is inoffensive, etc.). The system can provide instructions to the content item creator on how to become a valid promoter (e.g., "if you use #ILoveHealthJuice, you can be eligible to be compensated for your promotion"). In some embodiments, an author of the content item can supply a verification key to the social media content distribution system, a marketplace, etc. that can be used to review the database/blockchain and verify that the author is a prior purchaser of the product based on a purchase entry in the database/blockchain. Prior purchase verification can be used to confirm that an author of a social media post, a review on a website, or a reseller of a product was a verified prior purchaser. This can help with review fraud where non-purchasers might be paid to provide inauthentic reviews; verified reviews (even if provided at a website distinct from the marketplace) can provide proof of prior purchase via the database/blockchain.

In some embodiments, purchase entries on the database/blockchain can help identify the source of items for sale to minimize fraud and identify contaminated goods. For example, a purchaser of a food product can determine, based on prior sellers, that the food product may have been contaminated (e.g., if a seller has been involved with a food-safety issue). An example of using these techniques to identify fraud is that a seller can be forced to provide a unique identifier for a product (e.g., a MAC address or similar), a system can then look at the history of the unique ID and determine that the product was reported stolen. A system can also determine that the product was received in a broken condition and a refund was provided (e.g., if the item is then sold it might be indicative of return fraud).

Figure 2B:
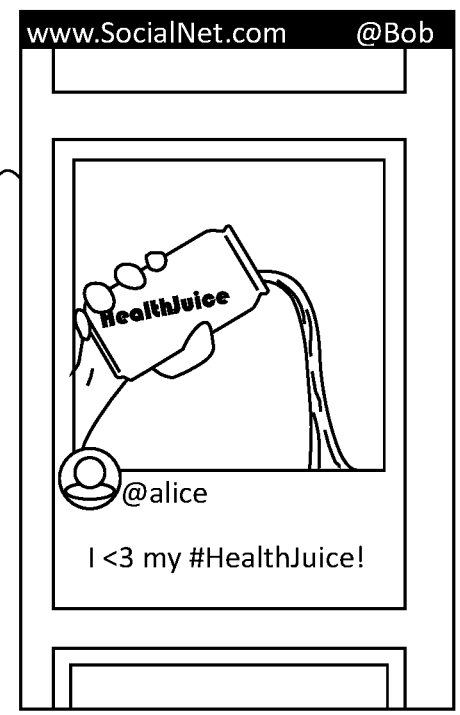

FIG. 2B depicts a screenshot 204 wherein a reader (Bob) views the content item created in screenshot 202. For example, Bob can be connected to Alice on the social media content distribution system and the social media content distribution system can present Alice's post to Bob. A system can determine that Bob saw the post, that Bob lingered on the post (e.g., had it displayed on a screen for a period of time), and/or that Bob interacted with the post (e.g., commented, shared, "liked," clicked a link, etc.). In some embodiments, a computing device that Bob operates to view the post can receive a unique identifier for the post, the author of the post, the product, and/or the social media content distribution system. Such unique identifiers can be distinct for this post (i.e., a first unique identifier can be used for Alice on this post whereas a second unique identifier for Alice can be used on a separate post). A unique identifier can be hidden and not displayed or otherwise presented but stored on the computing device.

The computing device that Bob operates to view the content item can report the viewing as an entry on the database/blockchain. Alternatively or additionally the content distribution system can report such action. When both Bob's computing device and the content distribution system report the action on the database/blockchain, other entities can be more confident that such action actually occurred.

Figure 2C:
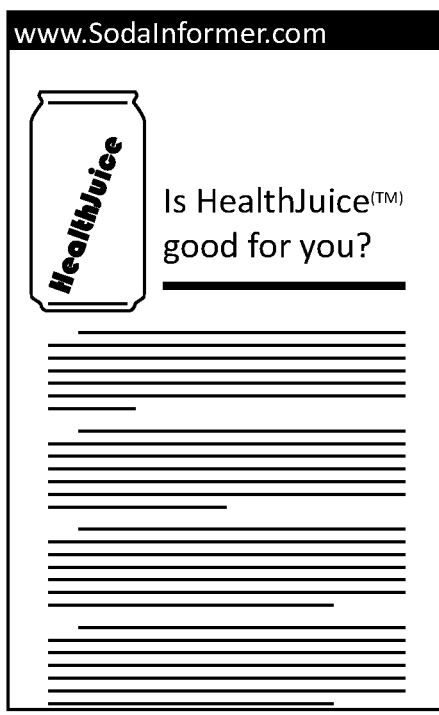

FIG. 2C depicts a screenshot 206 wherein the reader (Bob) does more research on the product. As described herein, the research can include visiting a review website, reviewing comparisons between various products, reading customer reviews, etc. The screenshot 206 shows an example research site "SodaInformer.com" where Bob can learn more about the product. A computing system for the review site and/or the reader can submit an entry to database/ blockchain recording the interaction. The entry can indicate how long the reader visited the site, a favorability score of the product as represented in the site, a review identifier, an author identifier, etc.

In some embodiments, the author and/or the review site can participate in an affiliate program and receive compensation based on an entry in the database/blockchain. In some embodiments, the review can indicate that the author may receive compensation for their review. In some embodiments, the review contains the same unique identifier as provided in the post of FIGS. 2A and 2B.

Figure 2D:
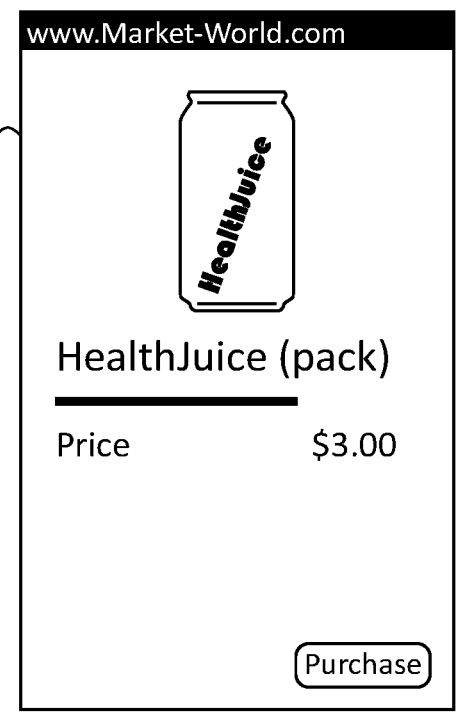

FIG. 2D depicts a screenshot 208 wherein the reader (Bob) purchases the product on a marketplace. The purchaser and/or the marketplace can record the transaction as an entry on the database/blockchain. In some embodiments, such an entry can serve as a proof of purchase, a receipt, an invoice etc. In some embodiments, the purchaser can use credits defined in the database/blockchain such as a cryptocurrency to pay for a least a portion of the purchase. In some embodiments, a user can rent, lease, download, sample, subscribe to, etc. to a digital or physical item. In some embodiments, if the user later returns the product (e.g., if the user is dissatisfied with the product), a follow-up entry can indicate as much. In some embodiments both the purchaser and the marketplace (e.g., systems operating on behalf of such) can put entries on the database/blockchain representing the transaction. If only one such entry is on the database, it can be ignored whereas if both are found, they can be accepted as valid.

In some embodiments, the reader can purchase or obtain the content while utilizing a content distribution system. For example, with the post on SocialNet, there can be an option for Bob the purchase or otherwise obtain the item that does not require Bob to go to a different place (e.g., the marketplace) to complete the transaction. This can be accomplished by incorporating a section of a marketplace website (or app, program, etc.) within the social media website (or app, program, etc.). The marketplace section can be rendered alongside or within the post on the social media website. In some embodiments, the social media website can coordinate the purchase of the item for the viewer and the marketplace.

Figure 3:
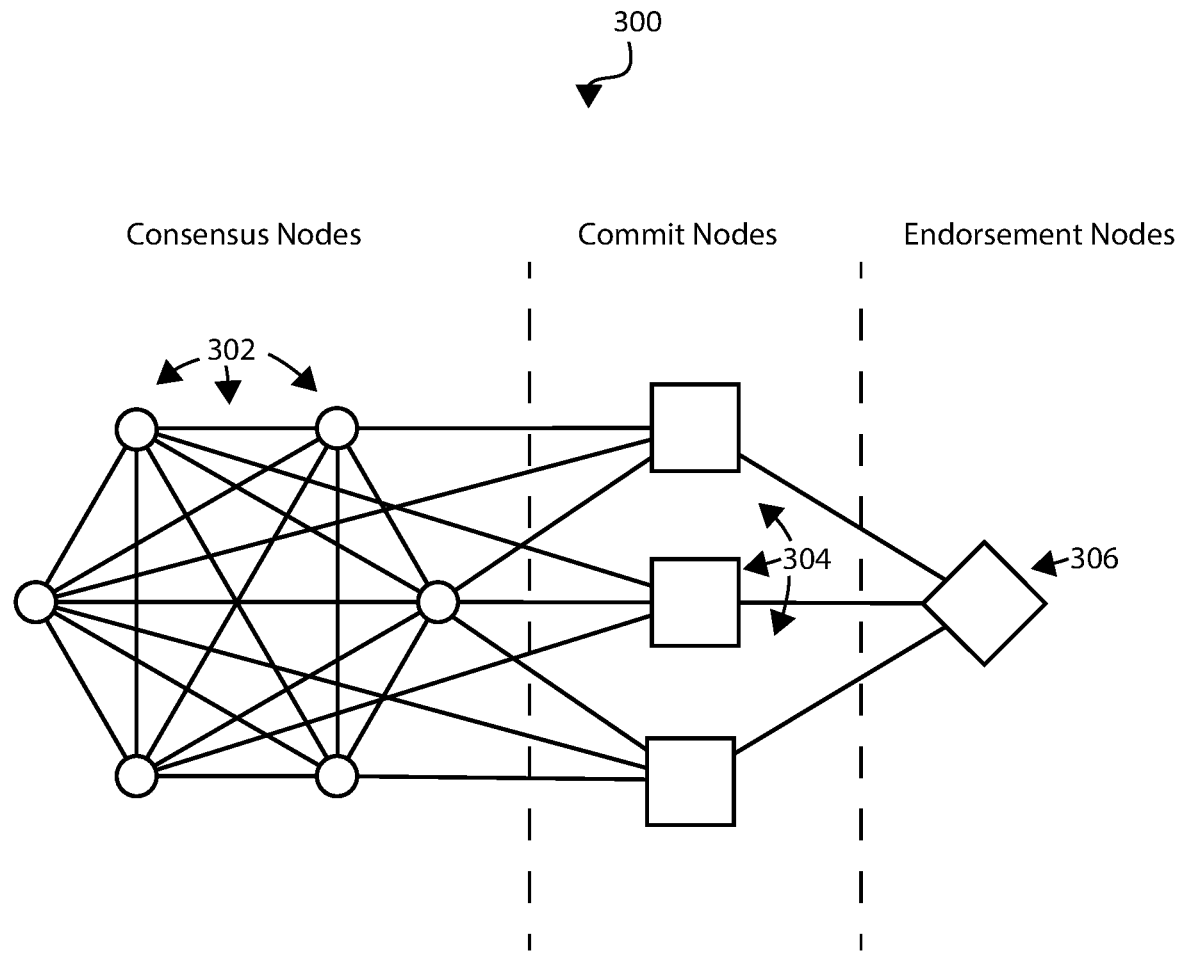
FIG. 3 depicts an example network with consensus nodes, commit nodes, and endorsement nodes.

FIG. 3 depicts an example network 300 with consensus nodes 302, commit nodes 304, and endorsement nodes 306. It should be understood that the example network 300 is representative of one example network topology. For example, more or fewer nodes can be present, nodes can have more or fewer roles (e.g., consensus, commit, and/or endorsement), nodes can connect to other nodes in ways not shown (e.g., consensus nodes can connect to endorsement nodes, commit nodes can interconnect, etc.), and connections can be bidirectional or unidirectional (e.g., one node can "read" from another node, but not change the state of that node).

Example network 300 can be "permissioned" such that only authorized nodes can operate within example network 300. An example of a permissioned network is a private blockchain. Nodes can be within a private network or on a public network such as the Internet. In some embodiments, any node can assume certain roles whereas only permissioned nodes can assume other roles.

In order to maintain the integrity of the blockchain and to identify an authoritative copy of the blockchain, a consensus network can be utilized. A consensus node (i.e., a node assuming a consensus role) can operate on a proof-of-work basis where the node attempts to identify a nonce solution to a cryptographic problem for a block. The largest blockchain can be considered authoritative (at least the older blocks on that chain). A 51% attack occurs when greater than 50% of consensus nodes are controlled by a malicious entity that can generate a false blockchain faster than the other nodes which can open the blockchain up to manipulation. In order to prevent a 51% attack, a verification system can ensure than an entity can only control a minority share of consensus nodes.

In some embodiments, the consensus nodes operate on a "proof-of-stake" model whereby consensus nodes' calculations are relied upon based on how much "stake" the respective node has in the system. This is dependent on the consensus nodes having an initial value within the system. Such an initial value can be a "buy-in" wherein each node is required to pay money into the system in order to operate. Other types of value are contemplated such as reputation on a social media network, a reputation on the marketplace, an internet reputation, amount of revenue transacted within the system (e.g., how much product is bought or sold within the system) etc.

A commit node 304 can supply entries for inclusion in the database/blockchain. These can be appended to the immutable database/blockchain. In some embodiments, entries must be validated before acceptance in the database/blockchain. For example, if two parties to a transaction both provide an entry the entries can be considered validated. In some embodiments, an endorsement or verification can be used to authenticate the entry provided from the commit nodes.

An endorsement node 306 can enforce access control on the database/blockchain. For example, the endorsement node can maintain records of entities, their permissions, alternate identities for the entities, etc. When an entity wishes to participate in the database, that entity can submit a request to the endorsement node 306. The endorsement node can then validate the credentials of the entity and sign an identifier or the entry for submission on the database/ blockchain. In some embodiments, the endorsement node submits an entry to the database/blockchain indicating that the entity is authorized on the system.

FIGS. 4A-4D depict example ledgers according to various embodiments. While a master ledger 402 can be maintained in the network, certain portions of the master ledger 402 can be removed or cryptographically hidden so that other "redacted" ledgers can be generated for various entities based on their permission status. In some embodiments, multiple ledgers are maintained based on what types of entries are included and/or what parties can access the ledgers. For example, a purchase ledger can maintain a record of purchases for the marketplace and a social media ledger can maintain a record of social media posts; the marketplace can then have full access to the marketplace ledger but not the social media ledger. In some embodiments, the master ledger is maintained by systems with a secret and undiscoverable private key and entities such as a marketplace, social media content distribution system, and user can have limited ability to understand the database/ blockchain, but can interpret the results of smart contracts therein. For example, the entities can submit items to the database, but cannot peer into the database to audit entries or records. When the system maintaining the database executes a smart contract, it can output a state change indicating a result of a smart contract.

Figure 4A:
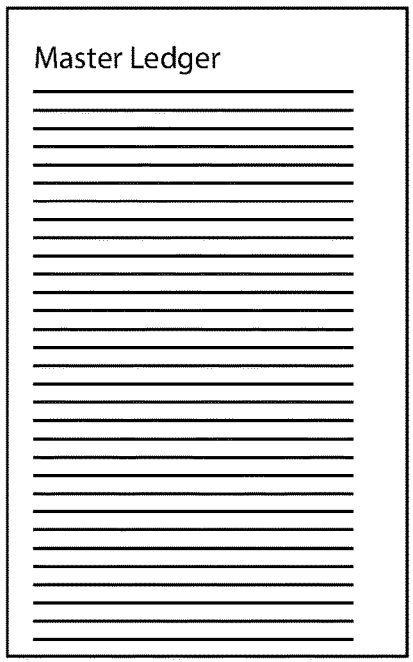
FIGS. 4A-4D depict example ledgers according to various embodiments.

FIG. 4A depicts an example master ledger 402. This can be cryptographically secured so that any entity acting individually cannot access the contents of the master ledger 402. In some embodiments all entities can access the master ledger 402 but cannot interpret the contents therein. In some embodiments, the master ledger merely provides verification for data stored on independent databases. For example, a manufacturer may be informed by a marketplace that a user purchased a product; the manufacturer can then find an entry that serves as verification for that transaction (e.g., it can be a hash of the transaction details). This way, the verification can be stored on the database/blockchain while the actual data is not stored on the database/blockchain.

Figure 4B:
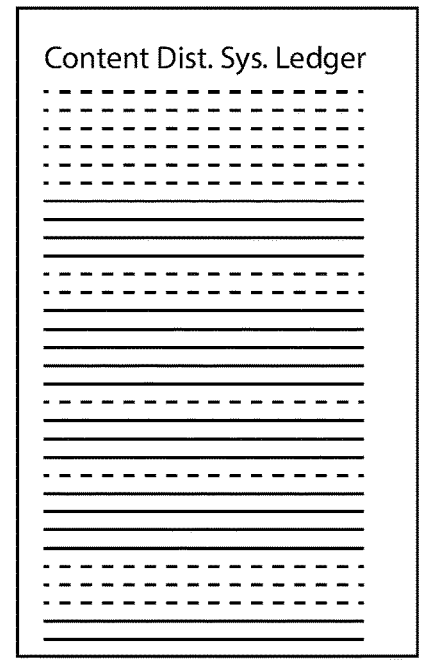
Figure 4C:
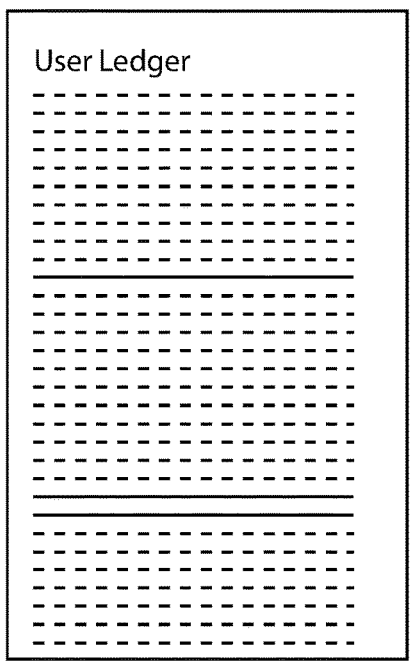

FIG. 4B depicts an example content distribution system ledger 404. The content distribution system ledger 404 can be accessible to a social medial content distribution system, a review content distribution system, etc. The content distribution system ledger can include information that is relevant to the content distribution system with all other data encrypted or removed. In some embodiments, only the content distribution system ledger 404 only includes information contributed from the content distribution system. FIG. 4C depicts an example user ledger 406. The user ledger 406 can include any entries that involve the user. In some embodiments, only those entries supplied by the user are presented in user ledger 406.

Figure 4D:
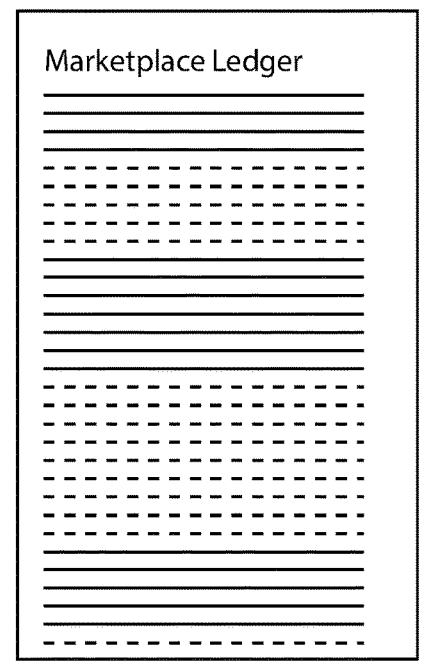

FIG. 4D depicts an example marketplace ledger 408. Marketplace ledger 408 can include information supplied to the marketplace or otherwise relevant to the marketplace. In some embodiments, entities can share ledgers, portions of ledgers, or access codes in order to validate that certain transactions or actions occurred. For example, if the marketplace ledger includes an entry that a purchase occurred, the entry can be sent to the content distribution system. The content distribution system can then validate the entry using the content distribution system ledger and review the contents of the entry for various purposes. For example, each copy of the ledger can merely include a hash of the respective entries. When an entity shares an entry with another entity, the other entity can review the entry, calculate a hash and verify that the entry was the correct entry identified in the content distribution system. To prevent an entity from selectively providing entries of interest to other parties, another identification hash can be stored that is used whenever a certain actor is involved with an entity. For example, every time a user Bob purchases an item on a marketplace, a hash of Bob's id and the marketplace can be included with the entry, thus if Bob returns the product, the same hash will be utilized. Similarly, a hash of the user and product identifiers can be utilized to keep track of actions involving the user and product without compromising the identities thereof.

Figure 5:
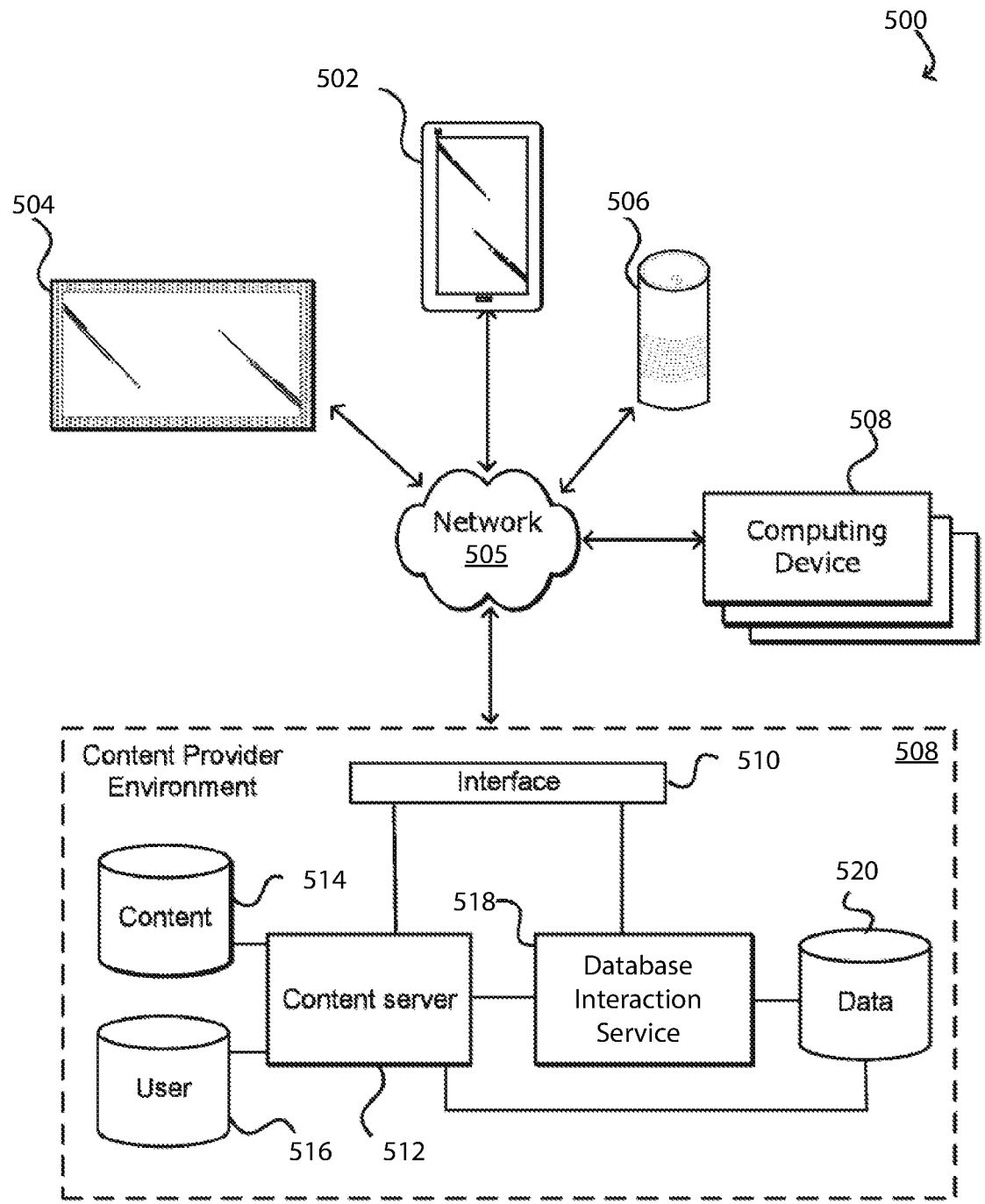
FIG. 5 illustrates an example of an environment that can be used to implement aspects in accordance with various embodiments.

FIG. 5 illustrates an example of an environment 500 that can be used to implement aspects in accordance with various embodiments. As described, various embodiments enable content to be presented on secondary computing devices remote a primary computing device. The secondary computing devices may be remote from and not tangibly connected with the primary computing device. In some embodiments, the primary and secondary computing devices may be tangible connected. In FIG. 5, client computing device 502 can represent the primary computing device and the secondary computing devices can include display device 504, active listening device 506, and computing devices 508 that can represent anyone of a number of devices. The primary computing device can communicate directly with one or more of the secondary computing devices. For example, devices can communicate one another using any communication protocol known in the art such as, but not limited to, BLUETOOTH®, Wi-Fi and radio frequency. Additional or alternatively, the devices can communicate through a resource provider environment 508 across at least one network 505. The devices can also communicate with the resource provider environment for various other purposes as described herein.

In this example, a call received to the resource provider environment 508 for additional or supplemental content can be received by an interface layer 510 of the environment. As known for network environments, the interface layer can include components such as interfaces (e.g., APIs), load balancers, request and/or data routers, and the like. In this example the request includes a content item query such as an image query. The request can be directed to one or more content servers 512, which can obtain the content (e.g., primary content and/or secondary content) from a content data store 514 or other such repository to be sent back across the network(s) to an appropriate one of the devices (502, 504, 506, 508). In some embodiments, information for the request might also be compared against user data in a user data store 516 or other such location do determine, for example, whether the user has access rights to that content.

In some cases, a request received to the content provider environment 508 might be from another entity, such as one of the secondary computing devices As discussed elsewhere herein, additional or secondary computing devices can present secondary content to users as part of, or along with, the primary content. The interface layer can determine the type of request and cause information to be forwarded to content server 512 or database interaction service 518 or other such system or service. In various embodiments, the database interaction service 518 can manage identities, cryptographic functions (e.g., encrypting or decrypting items in a database/blockchain), and validating entries in a database/blockchain. Information for such information may be included in the request and/or obtained from user data store 516. In various embodiments, the devices can receive input to control the presentation of content. The input can be a touch-based input, a gesture-based input (e.g., waving at the primary computing device), an audio-based input (e.g., utterance received by the primary computing device), a motion-based input (e.g., movement of the primary computing device), an image-based input, among other such inputs. The input can trigger a request for content, and the content server and/or the image analysis service can determine the appropriate content to be provided. Accordingly, a user can view and interact with presented content, and can maneuver through various content items using various approaches discussed and suggested herein.

Figure 6:
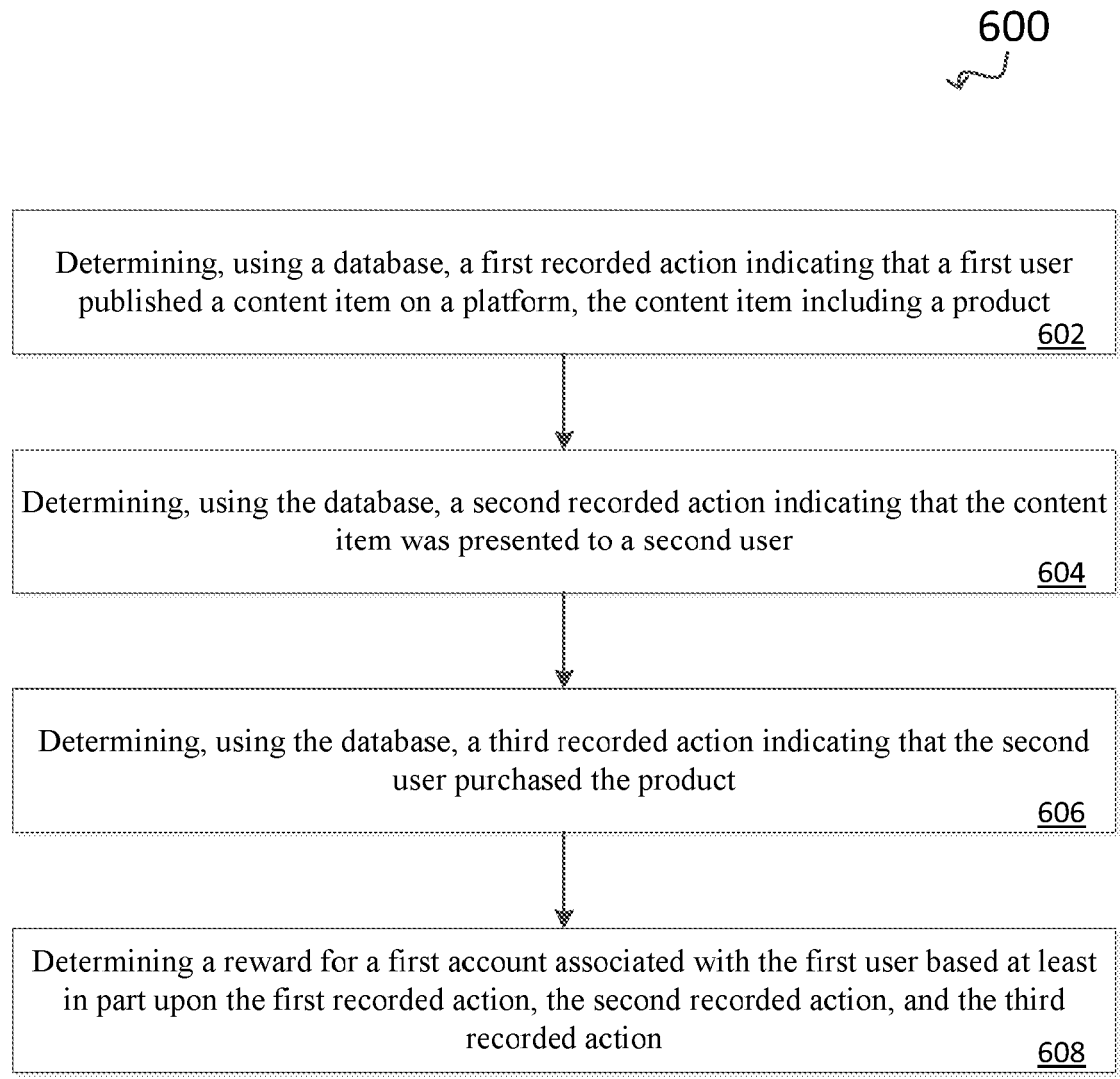
FIG. 6 illustrates an example method according to various embodiments.

FIG. 6 illustrates an example method 600 according to various embodiments. The steps of example method 600 can be performed in any order by one or more systems. In some embodiments, certain steps can be added or omitted as appropriate. A system can determine, using a database, a first recorded action indicating that a first user published a content item on a content distribution system, the content item including a product 600. For example, the first recorded action can be stored to represent that a user published a post on social media referencing a product. This record can be a block or entry in a database or blockchain. In some embodiments, only certain parties can access this entry.

For the purposes used herein, a "product" is an example of an item of interest. Such items of interests can be web sites, applications, software, digital content, physical products, etc.

A system can determine, using the database, a second recorded action indicating that the content item was presented to a second user 604. For example, the second user can read, watch, listen, etc. to the content item published by the first user. Either the second user or the content distribution system can record the first and second actions. In some embodiments, the second user (e.g., a computing device for the user) can have their identity masked, encrypted, or otherwise made private so that only authorized entities can determine that the second user perceived the content item.

A system can determine, using the database, a third recorded action indicating that a second user purchased (e.g., "obtained") the product 606. For example, an item repository (e.g., marketplace) can store an entry in the database after the user has purchased the product. This entry can be linked to the other two entries (e.g., recorded actions) so that an authorized entity can identify the history of how the second user was motivated to purchase the product.

A system can determine a reward for a first account associated with a first user based at least in part upon the first recorded action, the second recorded action, and the third recorded action 608. For example, a smart contract operating in a blockchain can specify that when a user views a promotion and then purchases a product, the promoter (e.g., the first user) can receive a reward for the promotion.

The recorded actions of example method 600 can refer to blocks of a blockchain or data within blocks of the blockchain. In some embodiments, a participant of the blockchain and/or database can sign a recorded action to certify it. For example, a user (or device associated with the user) can sign an action indicating that the user created a post, published a post, saw a post, clicked a link, purchased an item etc. While the private keys can be maintained by the different participants, the corresponding public keys can be stored in a validation server. An entity when reviewing the blockchain can validate the recorded actions using the public keys.

Figure 7A:
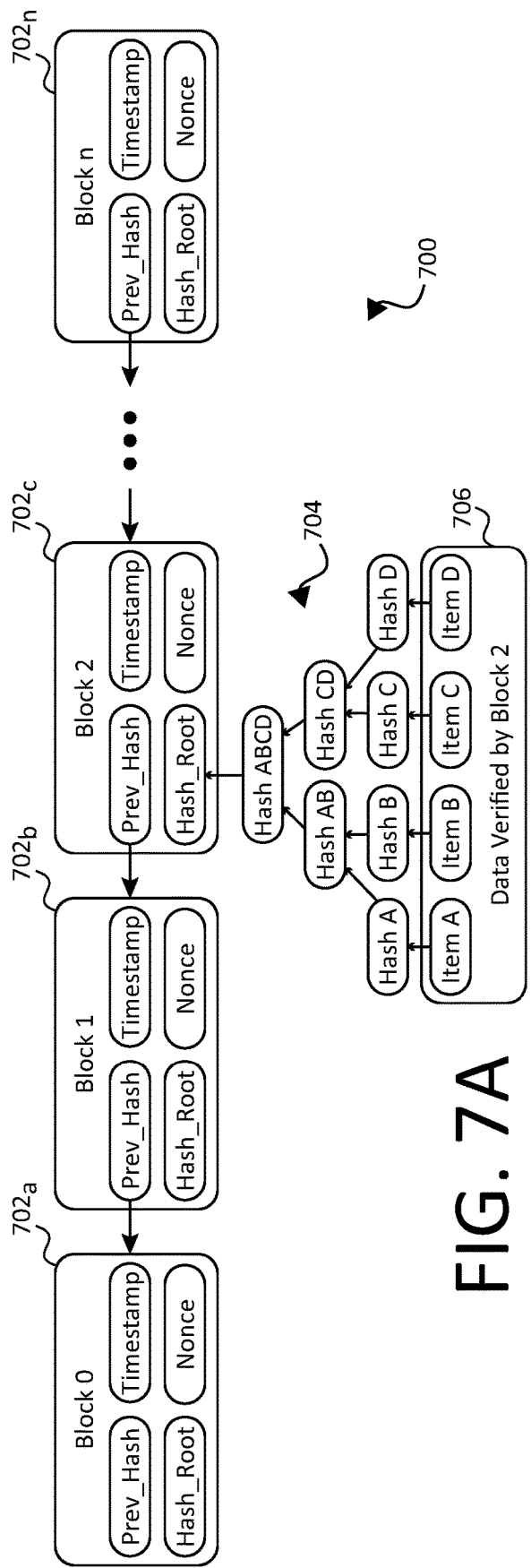
FIGS. 7A and 7B illustrate example blockchains according to various embodiments.
Figure 7B:
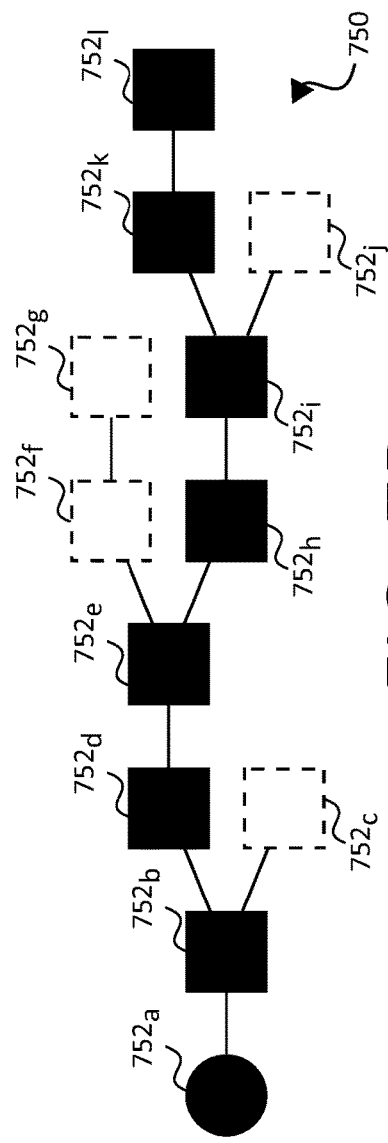

FIGS. 7A and 7B illustrate example blockchains according to various embodiments. A blockchain can be a growing list of records, called blocks, which are linked cryptographically. For example, in FIG. 7A example blockchain 700 includes various blocks (e.g., blocks 702$_a$-702$_n$) that are linked using hashes of previous blocks. Block 702$_a$ ("Block 0") can be considered the "genesis block" or the only block in the blockchain without a link to a prior block, its prev_hash value can be empty or disregarded. Block 702$_b$ ("Block 1") can be the second block in the blockchain with a prev_hash that equals a hash of the entirety of block 702$_a$. This chain can continue through block 702$_c$ until the newest block, block 702$_n$. As new blocks are added, they contain the hash of the last block of the blockchain. In this way, if any block in the chain is altered, its hash would need to be changed, thus breaking the link with the next block. An attempt to change a block but maintain the blockchain would also require a change to every subsequent block to update their prev_hash values.

Central to many implementations of blockchains, a cryptographic hash function maps data of arbitrary size to data of a fixed size using a one-way function, that is, a function that is infeasible to invert. As used herein a "hash" of data is the resultant value when the data is passed through a hash function. An example cryptographic hash function is the Secure Hash Algorithm (e.g., SHA-2 and SHA-3) and its implementations such as SHA-256 and SHA-512, which are distinguished based on the length of the result of the hash function or "digest."

Each block 702 can contain a hash of the previous block, a timestamp, a hash root, and a nonce (or proof of work). The hash of the previous block links the current block to its predecessor, as described above. The timestamp can be the time when the block was created. Because clock synchronization is difficult in local systems and distributed systems more so, the timestamp can be accepted as long as it is within a plausible range. The timestamp can be used for timekeeping in the blockchain and can be used for certain features of the blockchain such as smart contracts and increasing proof-of-work difficulty. The nonce can be an arbitrary number that causes the hash of the respective block to satisfy a condition (e.g., the first 12 digits of the hash are 0s). A "miner" of the block would have to use a brute-force strategy of "guessing" nonces until the resulting hash satisfies the condition. The nonce can serve as a proof of work, proving that the miner put significant effort to generate the block. The proof of work requirement ensures that modifications to a block in the blockchain (and all the previous hash's of each subsequent block) are increasingly difficult because the modifier would have to find new nonces for each modified block.

A proof of work consensus mechanism can require a significant amount of energy in the system. In order to reduce the energy required to generate a block, a proof of stake consensus mechanism can be implemented. With proof of stake, a miner is randomly selected based on the percentage of the blockchain controlled by the minor. Thus, those with greater investment in the blockchain have a greater interest in the accuracy thereof.

The hash root can be the root of a Merkle tree used to verify multiple data items 706. A Merkle tree 704 can generate a hash of a single data item (e.g., Hash A of Item A) then combine two or more hashes to form a new hash (e.g., Hash AB from Hash A and Hash B) and so on until a final hash is derived from each individual data item hash. If even a single bit of a data item is modified, then the hash root will need to be changed and all subsequent block's "previous hash" identifier which will then require new nonces to be found. The data items 706 can be stored within the block or in an external database. If the data items are stored in a separate database and just the hash root is stored in the block, if any of the data items are inaccessible or modified, none of the other data items in the block will be able to be verified. In some embodiments, the data items can be stored in a separate database (e.g., Item A can be stored in a private server) while hashes of the data items (e.g., Hash A) can be stored in the blockchain. This approach can be helpful when data items are significantly large.

In some embodiments, the data items can include transactions. These transactions can include a currency that only exists within the blockchain. For example, when a miner mines a block, the miner can include a reward for an address controlled by the miner. These rewards can be standardized, for example based on the age of the blockchain or the timestamp of the block. Participants in the blockchain can have "accounts" in the blockchain with public addresses and private keys. Transactions on the blockchain can indicate a sender address(es) and recipient address(es) and can be signed by the private key(s) of the sender. Participants can broadcast transactions hoping that miners will incorporate the transactions into their blocks. A participant can add a reward incentive to encourage miners to incorporate a transaction.

FIG. 7B illustrates an example blockchain 750 according to some embodiments. The genesis block 752$_a$ can be followed by the authoritative blockchain indicated with solid fill while orphaned blockchains are indicated with dashed squares. In some embodiments, multiple miners might mine a block at the same time; for example, block 752$_d$ and block 752$_c$ might be mined substantially simultaneously after block 752$_b$ is added to the blockchain. This can temporarily create a fork in the blockchain. Miners can then choose which fork to add a block to, either 752$_d$ or 752$_c$. Once block 752$_e$ is added to block 752$_d$, that blockchain is longer than the competing blockchain of the fork and is thus considered authoritative. In short, the longest blockchain can always be considered authoritative. Because simultaneous mining can cause a fork to extend such as occurs with blocks 752$_f$-752$_i$, it is prudent to only consider blocks that are relatively old to be considered settled. Newer blocks may end up on "orphaned" branches which were deemed unauthoritative. Such orphaned branches and block can be discarded.

Figure 8:
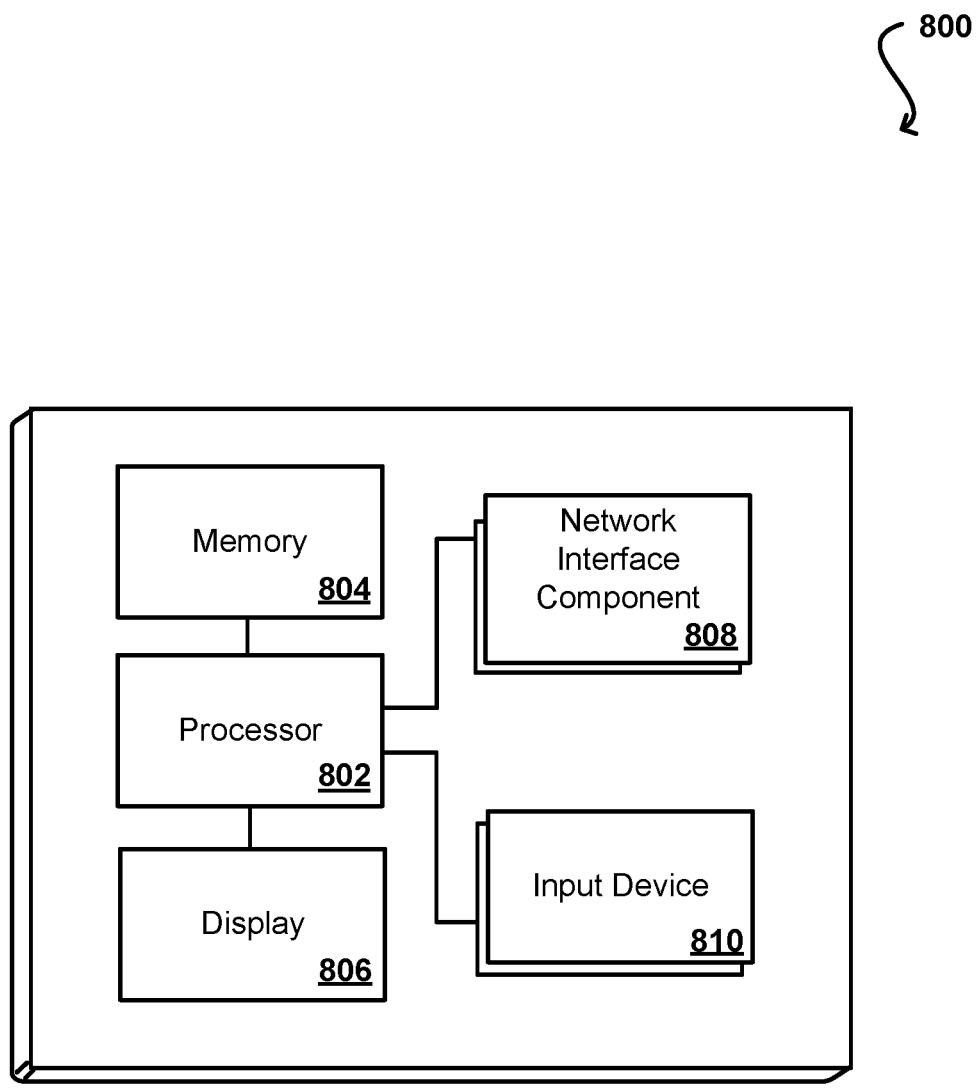
FIG. 8 illustrates example components of a computing device that can be utilized in accordance with various embodiments.

FIG. 8 illustrates a logical arrangement of a set of general components of an example computing device 800 that can be used to implement aspects of the various embodiments. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one input element 810 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. Other input means are contemplated to enable human interface of the device such as motion tracking, brain activity tracking, etc. In some embodiments, the computing device 800 of FIG. 8 can include one or more network interface components 808 for communicating over various networks, such as a Wi-Fi, Bluetooth, RF, wired, or wireless communication systems. The device in many embodiments can communicate with a network, such as the Internet, and may be able to communicate with other such devices.

Figure 9:
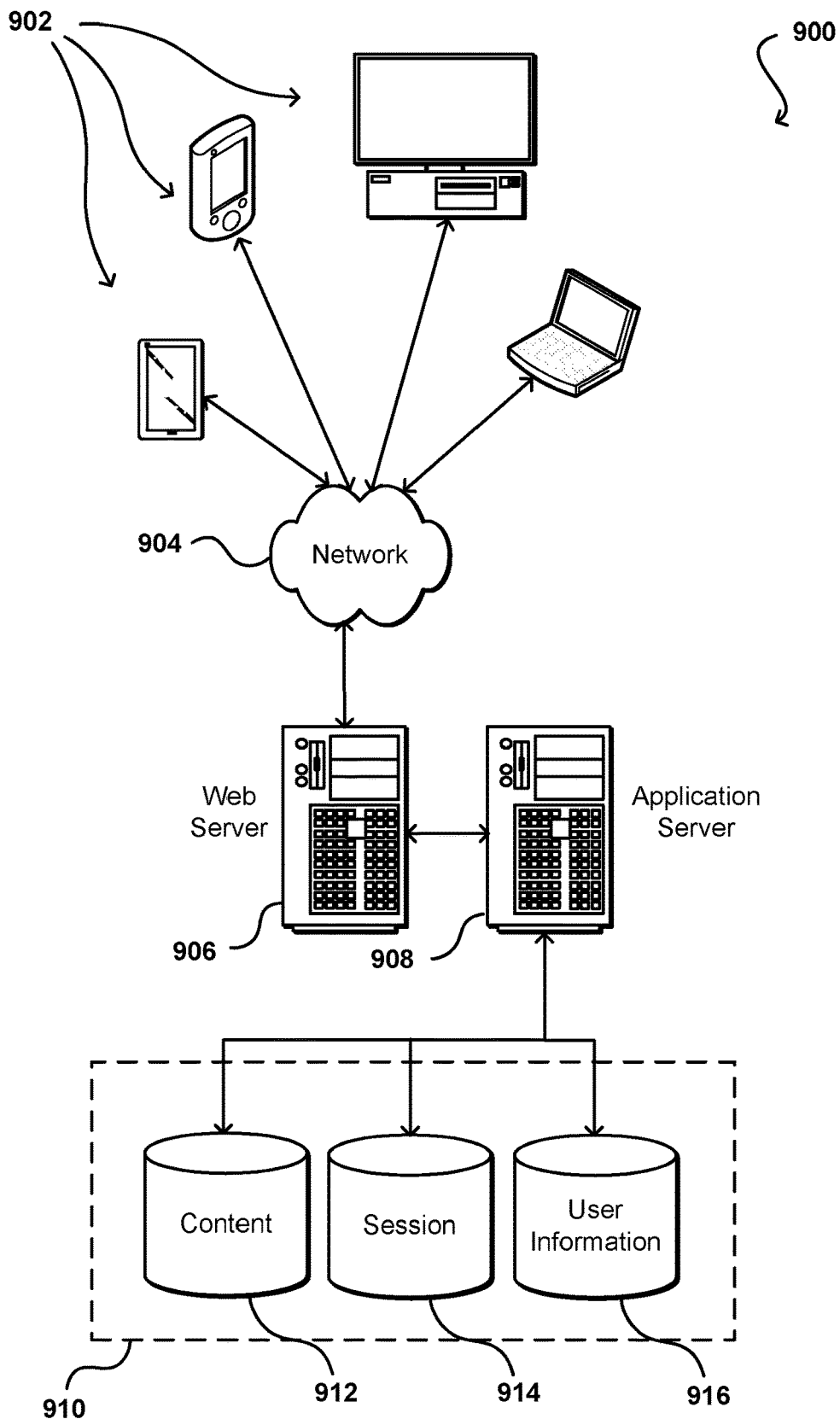
FIG. 9 illustrates an example environment in which aspects of the various embodiments can be implemented.

As discussed, different approaches can be implemented in various environments in accordance with the described embodiments. For example, FIG. 9 illustrates an example of an environment 900 for implementing aspects in accordance with various embodiments, such as to obtain content to be rendered by a 3D or VR headset, or other such device or display. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. This can include, for example, image information captured for the face of a user or a request for virtual reality content to be rendered on a virtual reality headset or other such device. Examples of client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method comprising:
   receiving a request associated with a first user to participate in a blockchain, the request including credentials;
   authenticating the request based on the credentials;
   generating an identifier for the first user;
   determining a first record in a first block in the blockchain indicating that the first user published a post on a social media site, the post highlighting an item and including the identifier for the first user;
   determining a second record in a second block in the blockchain indicating that the post was viewed by a second user;
   determining a third record in a third block in the blockchain indicating that the second user obtained the item;
   determining, using a smart contract stored in the blockchain, that the first user contributed to the second user obtaining the item based in part upon the first record, the second record, and the third record; and
   determining, using the smart contract, a credit to the identifier for the first user.

2. The computer-implemented method of claim 1, further comprising:
   receiving a request associated with the second user to obtain the item;
   providing the item to the second user; and
   appending the third block to the blockchain, the third block including one or more details of the request.

3. The computer-implemented method of claim 1, further comprising:
   determining a first time associated with the first blockchain item and a second time associated with the second blockchain item;
   calculating a time difference between the first time and the second time; and
   determining the credit for the account associated with the first user further based in part upon the time difference being less than a threshold value.

4. A computer-implemented method comprising:
   determining a first recorded action of a database indicating that a first user published a content item with a first entity, the content item including an item of interest, wherein the database is immutable, append-only, and validated through a distributed consensus protocol;
   validating the first recorded action by determining that the first user signed the first recorded action;
   determining a second recorded action of the database indicating that the content item was presented to a second user;
   validating the second recorded action by determining that the second user signed the second recorded action;
   determining a third recorded action of the database indicating that the second user obtained the item of interest, using an anonymized identifier for the second user; and
   determining that the first user contributed to the second user obtaining the item of interest based at least in part upon the first recorded action, the second recorded action, and the third recorded action.

5. The computer-implemented method of claim 4, further comprising:
   generating a first cryptographically secure identity for the second user, wherein the second recorded action and the third recorded action indicate the second user using the first cryptographically secure identity.

6. The computer-implemented method of claim 5, further comprising:
   associating the first cryptographically secure identity with the item of interest;
   generating a second cryptographically secure identity for the second user; and
   associating the second cryptographically secure identity with a second item of interest.

7. The computer-implemented method of claim 4, further comprising:
   appending a fourth recorded action to a first copy of the database stored on an item repository;
   determining a consensus between the first entity, the item repository, and a third system that the first copy of the database is authoritative; and
   storing the first copy of the database on the first entity.

8. The computer-implemented method of claim 7, wherein determining a consensus includes:
   determining a proof-of-stake of the item repository.

9. The computer-implemented method of claim 4, further comprising:
   receiving a request at a permission authority to allow the first user to add to the database, the request including first user credentials;
   validating the first user credentials; and
   generating a first user identity, wherein the first recorded action is cryptographically signed by the first user identity.

10. The computer-implemented method of claim 9, further comprising:
    validating the first recorded action by the first entity.

11. The computer-implemented method of claim 4, further comprising:
    determining a credit for the first user;
    appending a smart contract to the database specifying at least the credit, the item of interest, and a time threshold;
    determining a first time associated with the first recorded action and a second time associated with the third recorded action; and
    determining that a difference between first time and the second time is less than the time threshold.

12. The computer-implemented method of claim 4, further comprising:
    determining a credit for the first user;
    receiving, at an item repository, a request to perform a transaction using the credit;
    determining, using the database, a fourth action transferring the credit to the item repository;
    determining a consensus for the database up to the fourth action; and
    permitting the transaction at the item repository.

13. The computer-implemented method of claim 4, wherein the credit is a grant of cryptocurrency.

14. A system, comprising:
    at least one processor; and
    memory including instructions that, when executed by the at least one processor, cause the system to:
        determine a first recorded action of a database indicating that a first user published a content item on a first entity, the content item including an item of interest;
        validate the first recorded action by determining that the first user signed the first recorded action;
        determine, using the database, a second recorded action indicating that the content item was presented to a second user;

validate the second recorded action by determining that the second user signed the second recorded action;

determine, using the database, a third recorded action indicating that the second user engaged the item of interest; and determine that the first user contributed to the second user engaging with the item of interest based at least in part upon the first recorded action, the second recorded action, and the third recorded action.

15. The system of claim 14, wherein the instructions when executed further cause the system to:

generate a first cryptographically secure identity for the second user, wherein the second recorded action and the third recorded action indicate the second user using the first cryptographically secure identity.

16. The system of claim 15, wherein the instructions when executed further cause the system to:

associate the first cryptographically secure identity with the item of interest;

generate a second cryptographically secure identity for the second user; and associate the second cryptographically secure identity with a second item of interest.

17. The system of claim 14, wherein the instructions when executed further cause the system to:

append a fourth recorded action to a first copy of the database stored on an item repository;

determine a consensus between the first entity, the item repository, and a third system that the first copy of the database is authoritative; and store the first copy of the database on the first entity.

18. The system of claim 14, wherein the instructions when executed further cause the system to:

receive a request at a permission authority to allow the first user to add to the database, the request including first user credentials;

validate the first user credentials; and generate a first user identity, wherein the first recorded action is cryptographically signed by the first user identity.

19. The system of claim 14, wherein the instructions when executed further cause the system to:

determine a credit for the first user;

append a smart contract to the database specifying at least the credit, the item of interest, and a time threshold;

determine a first time associated with the first recorded action and a second time associated with the third recorded action; and determine that a difference between first time and the second time is less than the time threshold.

20. The system of claim 14, wherein the instructions when executed further cause the system to:

determine a credit for the first user;

receiving, at an item repository, a request to perform a transaction using the credit;

determining, using the database, a fourth action transferring the credit to the item repository;

determining a consensus for the database up to the fourth action; and permitting the transaction at the item repository.

* * * * *